United States Patent Office 2,864,832
Patented Dec. 16, 1958

2,864,832

11β-HYDROXY-17α-METHYL-1-DEHYDROTESTOSTERONE, AND THE 11β,17β-DIACYLATES THEREOF

Samuel H. Eppstein, Galesburg, Peter D. Meister, Kalamazoo Township, Kalamazoo County, Mich., and Adolph Weintraub, Brooklyn, N. Y., assignors to The Upjohn Company, Kalamazoo, Mich., a corporation of Michigan No Drawing. Application August 21, 1956
Serial No. 605,441

6 Claims. (Cl. 260—397.45)

The present invention relates to steroid compounds and is more particularly concerned with 11β-hydroxy-17α-methyl-1-dehydrotestosterone, the 11β,17β-diacylates thereof and a process for the production therefor..

This invention is a continuation-in-part of application Serial Number 493,302, filed March 9, 1955, now abandoned.

The compounds of the present invention are illustratively represented by the formula:

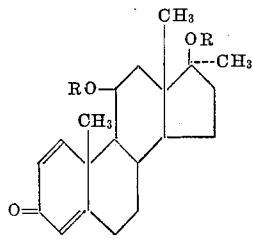

wherein R is selected from the group consisting of hydrogen and acyl, in which the acyl group is of an organic carboxylic acid, preferably of a hydrocarbon carboxylic acid containing from one to eight carbon atoms, inclusive.

The process of the present invention comprises: fermentative dehydrogenation of 11β-hydroxy-17α-methyltestosterone by a fungus of the genus Septomyxa, especially the species Septomyxa affinis (Sherb), American Type Culture Collection Number 6737. The genus Septomyxa belongs to the class of Deuteromyces, Fungi imperfecti, of the order Melanconiales, of the family Melanconiaceae.

Esterification of the 11β-hydroxy group and tertiary 17β-hydroxy may be accomplished by admixing 11β-hydroxy-17α-methyl-1-dehydrotestosterone with an acylating agent such as, for example, an acid anhydride or acid halide and heating at a temperature between about sixty degrees centigrade and the boiling point of the reaction mixture, usually not above 175 degrees centigrade. In the preferred embodiment of the invention the reaction mixture is kept at one hundred degrees centigrade in a water-bath for a period between about one hour and about 24 hours. In case an acid anhydride has been used the 11β,17β-diacyloxy-17α-methyl-1,4-androstadiene-3-one is obtained. If acyl halides have been used mixtures of 11β,17β-diacyloxy-17α-methyl-1,4-androstadiene-3-one and the 3-enol acylates thereof are obtained. In this latter case mild hydrolysis at room temperature (15–35 degrees centigrade) with a mineral acid, such as hydrochloric, chloric, or sulfuric acid gives the corresponding 11β,17β-diacyloxy-17α-methyl-1,4-androstadiene-3-one (11β-hydroxy-17α-methyl-1-dehydrotestosterone). The time of reaction as well as the temperature at which the reaction is carried out, the acylating agent and the ratio of reactants may be varied. The reaction mixture is suitably poured into ice or cold water, the product collected in an appropriate solvent which is thereafter washed with successive portions of a mildly basic solution in water to obtain a solution of the product which is essentially neutral.

In some instances the product may crystallize from the reaction mixture, in which case it may be advantageous to separate the product by filtration or other means, wash with water and thereafter purify by conventional means, such as, for example, by recrystallization from a suitable solvent or by chromatographic purification as deemed necessary.

It is an object of the present invention to provide 11β,17β-dihydroxy-17α-methyl-1,4-androstadiene-3-one (11β-hydroxy-17α-methyl-1-dehydrotestosterone) and the 11β,17β-diesters thereof. It is a particular object of the present invention to provide 11β,17β-diacyloxy-17α-methyl-1,4-androstadiene-3-one wherein the acyl radical is of a hydrocarbon carboxylic acid containing from one to eight carbon atoms, inclusive. Another object of the present invention is the provision of a process for the production of such steroids. Other objects will be apparent to those skilled in the art to which this invention pertains.

The compounds of the instant invention 11β-hydroxy-17α-methyl-1-dehydrotestosterone and the 11β,17β-diesters thereof are important anabolic reagents with relatively little androgenic activity. As oral anabolic reagents they have activity greater than that of methyltestosterone and androgenic activity lesser than methyltestosterone. They are therefore useful agents in the treatment of patients where greater protein-anabolic activity is desirable without simultaneous increase in androgenic activity. Oxidizing the 11β-hydroxy group of 11β-hydroxy-17α-methyl-1-dehydrotestosterone, illustratively with chromic anhydride, yields another anabolically active compound 11-keto-1-dehydromethyltestosterone. Other pharmaceutically active compounds can be prepared from 11β-hydroxy-17α-methyl-1-dehydrotestosterone.

The starting materials in the instant application are 11β,17β-dihydroxy-17α-methyl-4-androsten-3-one (11β-hydroxy-17α-methyltestosterone) or esters thereof prepared by the method of Herr, U. S. Patent 2,735,854, issued February 21, 1956.

The following examples are illustrative of the process and products of the present invention, but are not to be construed as limiting.

Example 1

*11β,17β - dihydroxy - 17α - methyl - 1,4 - androstadien - 3-one (11β - hydroxy - 17α - methyl - 1 - dehydrotestosterone)*

Twelve liters of a medium containing one percent cerelose, two percent corn steep liquor (containing sixty percent solids) and adjusted to a pH of 5 was sterilized by heating for 45 minutes at twenty pounds pressure in a fermenter. This cooled fermentation mixture was inoculated with a 24-hour vegetative growth from a spore inoculation of *Septomyxa affinis,* aerated at 0.5 liter of air per minuted and stirred at 200 R. P. M. During the following 24 hours of growth, twenty milliliters of lard oil containing ten percent of octadecanol was added to reduce foaming. The pH was now 5.6. To this mixture two grams of 11β-hydroxy-17α-methyltestosterone, dissolved in twenty milliliters of hot absolute alcohol, was added and washed in with fifteen milliliters of alcohol. After an additional 24 hours for conversion, the fermentation was terminated. The pH was now 7.3. Dilute sulfuric acid was added to the mixture to bring the pH down to 3. Thereupon 85 grams of Celite diatomaceous earth was added and the beer was filtered. The mycelial cake was washed twice with one liter volume of acetone and twice with one liter volume of methylene chloride. These washings were used for the first extraction of the beer filtrate. The beer filtrate was washed three more times with two liter volumes of methylene chloride. The combined solvent extracts were washed twice with one liter volume of two percent sodium bicarbonate and once with two liters of water and finally dried with anhydrous sodium sulfate. The solvent was then removed in vacuo. An aliquot, analyzed by paper chromatography, showed about one percent 11β-hydroxy-17α-methyltestosterone, a large amount of 11β-hydroxy-17α-methyl-1-dehydrotestosterone and traces of a more polar product.

The extractives were triturated twice with four milliliter volumes of Skellysolve B hexanes, then four times with four-milliliter volumes of Skellysolve B hexanes-ether (4:1). The residue weighed 820 milligrams (41 percent yield).

This material was three times recrystallized from acetone to give needles of pure 11β-hydroxy-17α-methyl-1-dehydrotestosterone of melting point 262 to 265 degrees centigrade and rotation $[\alpha]_D^{23}$ plus forty degrees in chloroform;

$$\lambda_{max}^{ethanol}\ 243\ m\mu$$

E=14,450.

*Analysis.*—Calcd. for $C_{20}H_{28}O_3$: C, 75.91; H, 8.92. Found: C, 75.74; H, 9.00.

In the same manner as shown in Example 1, 11β-hydroxy-17α-methyl-1-dehydrotestosterone is obtained by submitting 11β-hydroxy-17α-methyltestosterone to microbial 1-dehydrogenation with other species of the genus Septomyxa such as *Septomyxa aesculi*, *Septomyxa corni*, *Septomyxa salicina* and *Septomyxa tulasuei*.

Instead of the 11β-hydroxy-17α-methyltestosterone, mono- or di-esters of this compound may be used as starting product yielding—by simultaneous hydrolysis—the unesterified final product, 11β-hydroxy-17α-methyl-1-dehydrotestosterone.

EXAMPLE 2

*11β-hydroxy-17α-methyl-1-dehydrotestosterone 11β,17β-diacetate*

A solution of 0.2 gram of 11β-hydroxy-17α-methyl-1-dehydrotestosterone, dissolved in five milliliters of acetic anhydride, was refluxed (at about 140 degrees centigrade) for a period of six hours. Thereafter the excess acetic anhydride was distilled off in vacuo until about one milliliter of residue was left. This residue was admixed with fifty milliliters of ice water and the precipitate thus formed collected on filter paper, recrystallized from ethyl acetate-acetone solution repeatedly to give 11β-hydroxy-17α-methyl-1-dehydrotestosterone 11β,17β-diacetate.

EXAMPLE 3

*11β-hydroxy-17α-methyl-1-dehydrotestosterone 11β,17β-dipropionate*

A solution of 0.2 gram of 11β-hydroxy-17α-methyl-1-dehydrotestosterone in five milliliters of propionic anhydride was heated for six hours on the water bath at 100 degrees. The mixture was thereupon distilled in vacuo until one milliliter of solution remained which was then admixed with ice water, the precipitate, thus formed, collected on filter and recrystallized from methanol to give 11β - hydroxy - 17α - methyl - 1 - dehydrotestosterone 11β,17β-dipropionate.

EXAMPLE 4

*11β-hydroxy-17α-methyl-1-dehydrotestosterone 11β,17β-dibenzoate*

A solution of 0.5 gram of 11β-hydroxy-17α-methyl-1-dehydrotestosterone in five milliliters of benzoyl chloride was heated on the water bath for a period of eight hours at 100 degrees. The mixture was thereupon distilled in vacuo until a residue of approximately one milliliter remained in the flask. This residue was transferred into ice water, stirred and the thus obtained precipitate collected on the filter. This precipitate (containing the 3-benzoyl enolate of 11β-hydroxy-17α-methyl-1-dehydrotestosterone 11β,17β-dibenzoate, was thereupon transferred into a solution of twenty milliliters of methanol, four milliliters of water and one milliliter of concentrated hydrochloric acid. This mixture was stirred for a period of two hours, then neutralized with sodium bicarbonate solution, heated on the water bath to eliminate the major portion of methanol and poured thereupon into fifty milliliters of water. After cooling the aqueous mixture was extracted with three 25-milliliter portions of methylene chloride, the combined methylene chloride extracts were washed with water, dried over anhydrous sodium sulfate and evaporated. The resulting residue from this evaporation was recrystallized from acetone-Skellysolve B hexanes to give 11β-hydroxy-17α-methyl-1-dehydrotestosterone 11β,17β-dibenzoate.

EXAMPLE 5

*11β-hydroxy-17α-methyl-1-dehydrotestosterone 11β,17β-dibutyrate*

In the same manner given in Example 2, heating a solution of 11β-hydroxy-17α-methyl-1-dehydrotestosterone in butyric anhydride produced 11β-hydroxy-17α-methyl-1-dehydrotestosterone 11β,17β-dibutyrate.

EXAMPLE 6

*11β-hydroxy-17α-methyl-1-dehydrotestosterone 11β,17β-divalerate*

In the same manner given in Example 2, heating a solution of 11β-hydroxy-17α-methyl-1-dehydrotestosterone in valeric anhydride produced 11β-hydroxy-17α-methyl-1-dehydrotestosterone 11β,17β-divalerate.

EXAMPLE 7

*11β-hydroxy-17α-methyl-1-dehydrotestosterone 11β,17β-dihexanoate*

In the same manner given in Example 3, heating a solution of 11β - hydroxy - 17α - methyl - 1 - dehydrotestosterone in hexanoic anhydride produced 11β-hydroxy - 17α - methyl - 1 - dehydrotestosterone 11β,17β-dihexanoate.

EXAMPLE 8

*11β-hydroxy-17α-methyl-1-dehydrotestosterone 11β,17β-di-(acid succinate)*

In the same manner given in Example 4, heating a solution of 11β - hydroxy - 17α - methyl - 1 - dehydrotestosterone with succinic anhydride in pyridine produced 11β - hydroxy - 17α - methyl - 1 - dehydrotestosterone 11β,17β-di-(acid succinate).

EXAMPLE 9

*11β-hydroxy-17α-methyl-1-dehydrotestosterone 11β,17β-di-(acid maleate)*

In the same manner given in Example 4, heating a solution of 11β-hydroxy - 17α - methyl - 1 - dehydrotestosterone with maleic anhydride in pyridine produced 11β - hydroxy - 17α - methyl - 1 - dehydrotestosterone 11β,17β-di-(acid maleate).

EXAMPLE 10

*11β-hydroxy-17α-methyl-1-dehydrotestosterone 11β,17β-di-(octanoate)*

In the same manner given in Example 4, heating a solution of 11β-hydroxy-1-dehydro-17α-methyltestosterone in octanoyl chloride and hydrolyzing the thus obtained mixture with dilute hydrochloric acid solution at room temperature (about 22 to 25 degrees centigrade) yielded 11β-hydroxy-17α-methyl-1-dehydrotestosterone 11β,17β-di-(octanoate).

EXAMPLE 11

*11β-hydroxy-17α-methyl-1-dehydrotestosterone 11β,17β-di-(trimethylacetate)*

In the same manner given in Example 4, heating a solution of 11β-hydroxy-17α-methyl-1-dehydrotestosterone in β-cyclopentylpropionyl chloride, and hydrolyzing the thus obtained mixture with sulfuric acid in aqueous ethanol at room temperature yielded 11β-hydroxy-17α-methyl-1-dehydrotestosterone 11β,17β-(di-β-cyclopentylpropionate).

EXAMPLE 12

*11β-hydroxy-17α-methyl-1-dehydrotestosterone 11β,17β-di-(β-cyclopentylpropionate)*

In the same manner given in Example 4, heating a solution of 11β-hydroxy-17α-methyl-1-dehydrotestosterone with trimethylacetyl chloride and pyridine and hydrolyzing the thus obtained mixture with hydrochloric acid solution at room temperature yielded 11β-hydroxy-17α-methyl-1-dehydrotestosterone 11β,17β-di(-trimethylacetate).

EXAMPLE 13

*11β-hydroxy-17α-methyl-1-dehydrotestosterone 11β,17β-di-phenylacetate*

In the same manner given in Example 4, heating a solution of 11β-hydroxy-17α-methyl-1-dehydrotestosterone in phenylacetyl chloride and hydrolyzing the thus obtained mixture with hydrochloric acid at room temperature yielded 11β-hydroxy-17α-methyl-1-dehydrotestosterone 11β,17β-di-phenylacetate.

EXAMPLE 14

*11β-hydroxy-17α-methyl-1-dehydrotestosterone 11β,17β-di-toluenesulfonate*

In the same manner given in Example 4, heating a solution of 11β-hydroxy-17α-methyl-1-dehydrotestosterone in pyridine solution with toluenesulfonyl chloride and hydrolyzing the thus obtained mixture with a sulfuric acid solution in ethanol at room temperature yielded 11β-hydroxy-17α-methyl-1-dehydrotestosterone 11β,17β-di-toluenesulfonate.

EXAMPLE 15

*11β-hydroxy-17α-methyl-1-dehydrotestosterone 11β,17β-di-phenylpropionate*

In the same manner given in Example 4, heating a solution of 11β-hydroxy-17α-methyl-1-dehydrotestosterone with phenylpropionyl chloride in pyridine and hydrolyzing the thus obtained mixture with methanolic hydrochloric acid at room temperature yielded 11β-hydroxy-17α-methyl-1-dehydrotestosterone 11β,17β-di-phenylpropionate.

In the same manner as shown in Examples 2 through 15, heating a solution of 11β-hydroxy-17α-methyl-1-dehydrotestosterone in an acid anhydride or respectively heating the steroid with an acid halide and hydrolyzing under mild conditions any 3-enolate present with a dilute mineral acid, produced other 11β-hydroxy-17α-methyl-1-dehydrotestosterone 11β,17β-diacylates, for example, the 11β,17β-diisobutyrate, diisovalerate, diheptanoate, dichloroacetate, dibromoacetate, diiodoacetate, difluoroacetate, dinicotinate, di-(2-furoate), dibenzenesulfonate, di-(ortho-, meta-, para-chlorobenzene-sulfonate), di-(3,5-dinitrobenzenesulfonate), di-(acid tartrate), or the like.

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:
1. A compound of the formula:

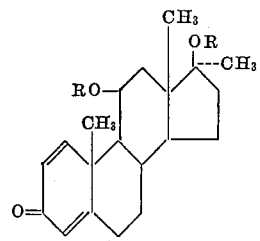

wherein R is selected from the group consisting of hydrogen and acyl in which the acyl group is of a hydrocarbon carboxylic acid containing from one to eight carbon atoms, inclusive.

2. 11β-hydroxy-17α-methyl-1-dehydrotestosterone.

3. 11β - hydroxy - 17α - methyl - 1 - dehydrotestosterone 11β,17β-diacetate.

4. 11β - hydroxy - 17α - methyl - 1 - dehydrotestosterone 11β,17β-dipropionate.

5. 11β - hydroxy - 17α - methyl - 1 - dehydrotestosterone 11β,17β-dibenzoate.

6. 11β - hydroxy - 17α - methyl - 1 - dehydrotestosterone 11β,17β-di-(β-cyclopentylpropionate).

References Cited in the file of this patent

UNITED STATES PATENTS

| | | |
|---|---|---|
| 2,602,769 | Murray | July 8, 1952 |
| 2,658,023 | Shull | Nov. 3, 1953 |
| 2,695,907 | Murray | Nov. 30, 1954 |
| 2,697,110 | Murray | Dec. 14, 1954 |
| 2,703,806 | Murray | Mar. 8, 1955 |
| 2,735,854 | Herr | Feb. 21, 1956 |

UNITED STATES PATENT OFFICE
Certificate of Correction

Patent No. 2,864,832                                                                                           December 16, 1958

Samuel H. Eppstein et al.

It is hereby certified that error appears in the printed specification of the above numbered patent requiring correction and that the said Letters Patent should read as corrected below.

Column 5, line 7, Example 11, in the heading, for "-(*trimethylacetate*)" read --(*β-cyclopentylpropionate*)--; line 17, Example 12, for "-(*β-cyclopentylpropionate*)" read --(*trimethylacetate*)--.

Signed and sealed this 2nd day of June 1959.

[SEAL]

Attest:
KARL H. AXLINE,
*Attesting Officer.*

ROBERT C. WATSON,
*Commissioner of Patents.*